Oct. 3, 1944. A. W. GUSTAFSON 2,359,520
CROP DUSTING MACHINE
Filed Oct. 8, 1941 5 Sheets-Sheet 5
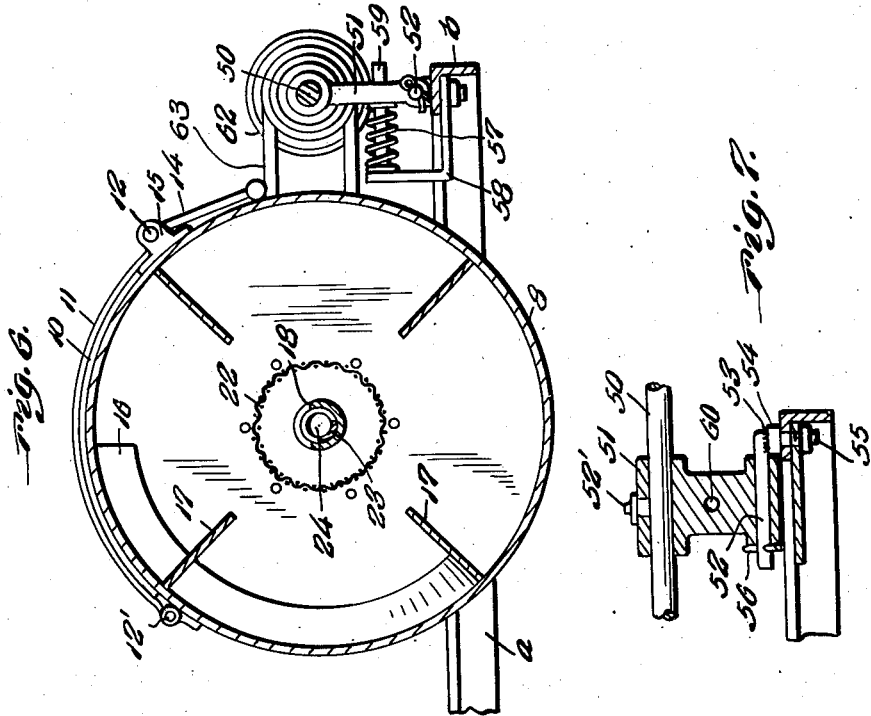
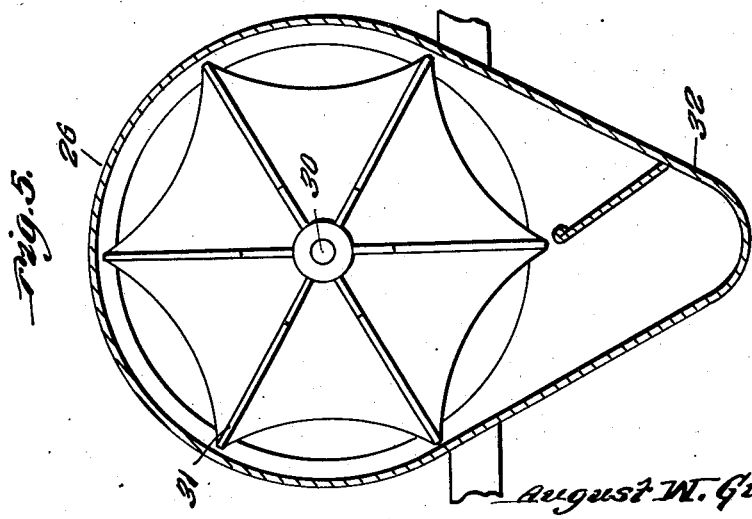
Inventor
August W. Gustafson
By Clarence A. O'Brien
Attorney Patented Oct. 3, 1944

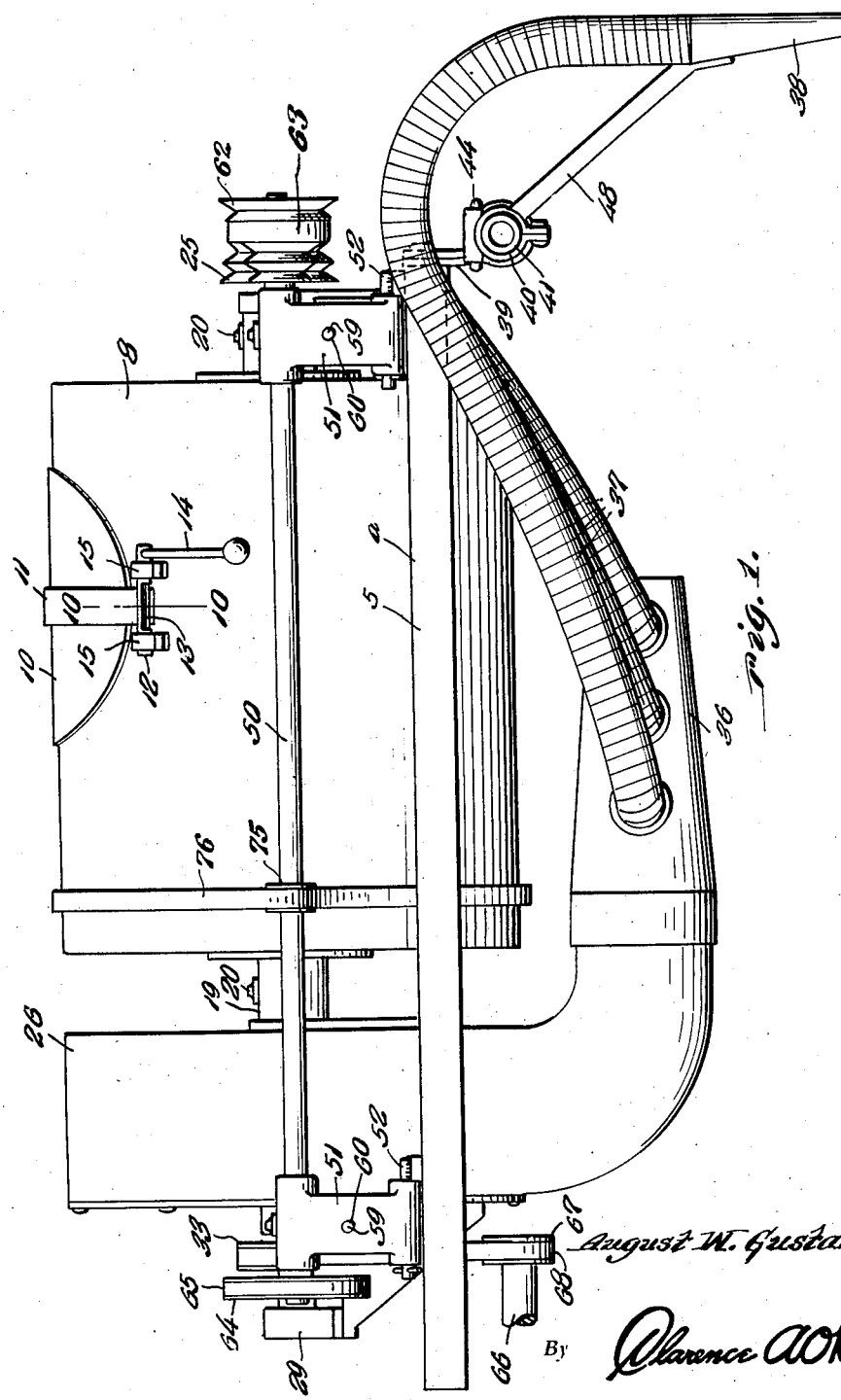

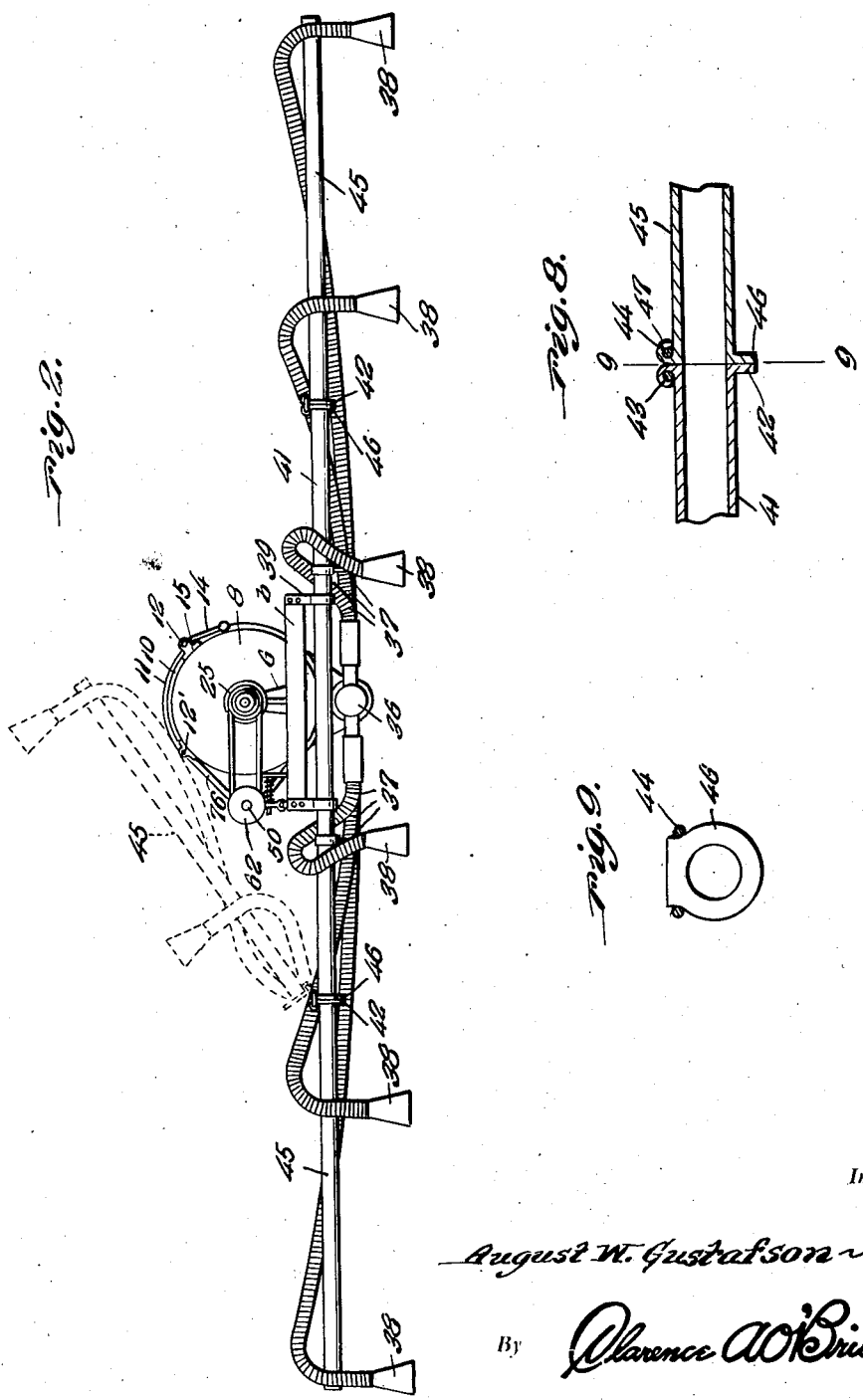

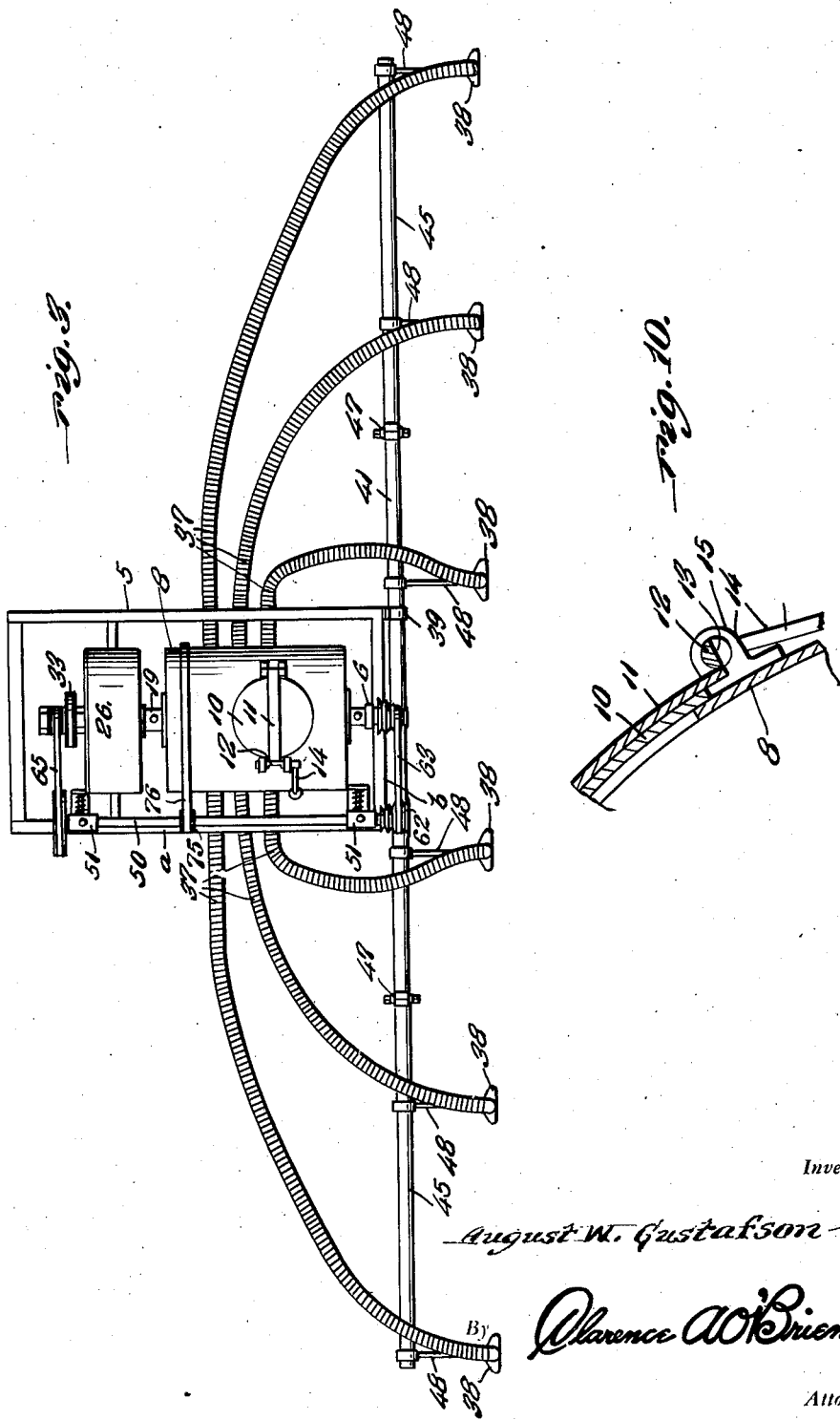

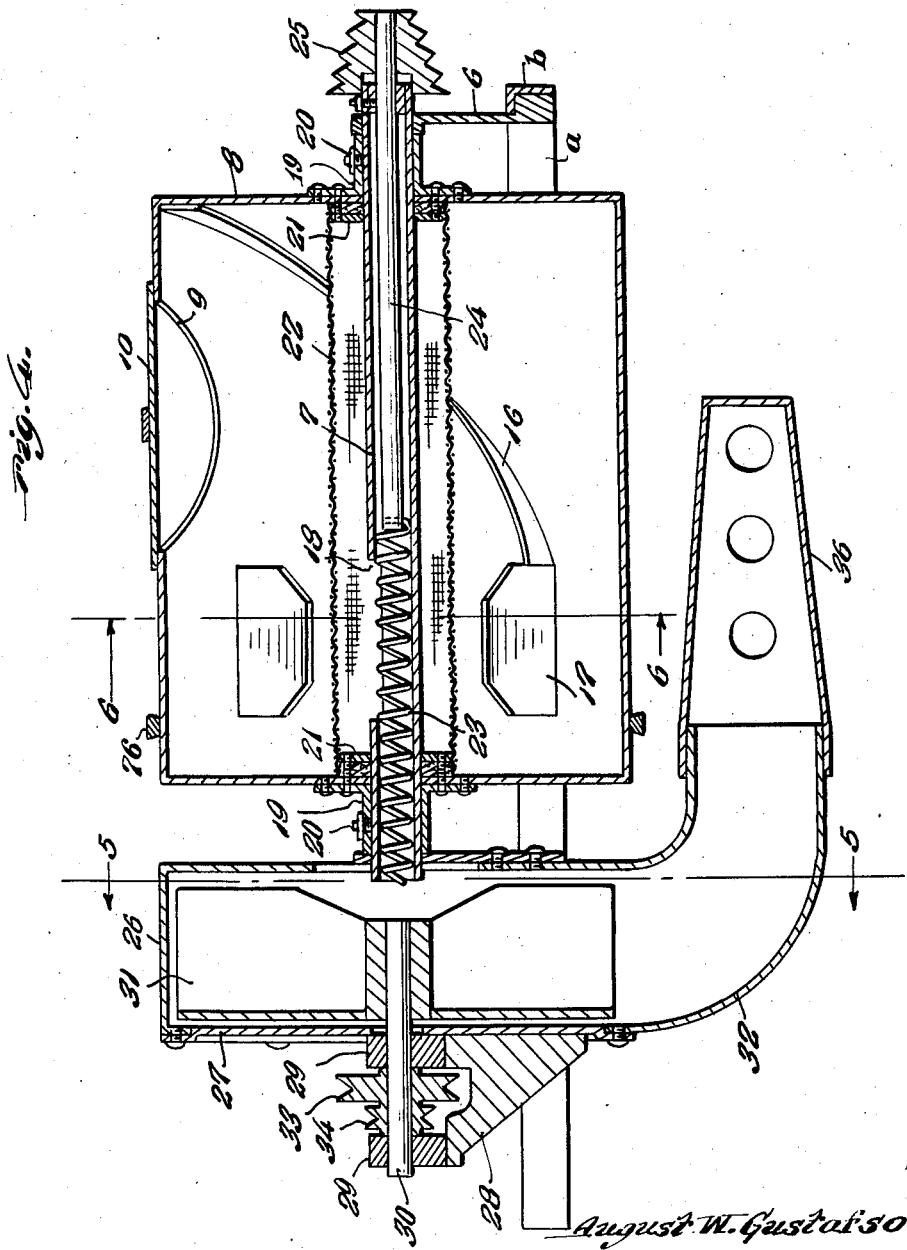

2,359,520

UNITED STATES PATENT OFFICE 2,359,520

CROP DUSTING MACHINE

August W. Gustafson, Corpus Christi, Tex.

Application October 8, 1941, Serial No. 414,182

3 Claims. (Cl. 43—148)

This invention is an improvement on my copending application filed February 7, 1939, and bearing Serial No. 255,127, which issued as Patent No. 2,283,805, May 19, 1942.

This invention relates to crop dusting machines and has as its principal object the provision of a machine whereby chemicals to kill insect life on crops are distributed uniformly and in a substantially automatic manner.

Another important object of the invention is to provide a machine of the character stated wherein the parts are positive acting and substantially foolproof in operation.

Still another important object of the invention is to provide a machine of the character stated wherein the various elements of construction are readily accessible for the purpose of repair or replacement of parts.

Other objects and advantages of the invention will become apparent to the reader of the following specification.

In the drawings—

Figure 1 represents a side elevational view of the apparatus.

Figure 2 is a rear elevational view.

Figure 3 is a top plan view.

Figure 4 is a longitudinal sectional view.

Figure 5 is a section on the line 5—5 of Figure 4.

Figure 6 is a section on the line 6—6 of Figure 4.

Figure 7 is a fragmentary detailed sectional view of one of the shaft mounts.

Figure 8 is a fragmentary longitudinal sectional view through one of the joints of the hanger pipe.

Figure 9 is a section on the line 9—9 of Figure 8.

Figure 10 is a fragmentary detailed sectional view taken substantially on the line 10—10 of Figure 1.

Referring to the drawings wherein like numerals designate like parts, it can be seen that numeral 5 denotes a frame which can be mounted on a wheeled carriage or otherwise supported in a mobile manner, this frame consisting of side members a, a and a rear member b. A support 6 rises from the rear member b and has an elongated stationary tube 7 extending at one end therethrough. Rotatably disposed on the tube 7 is a drum 8 which has a filler opening 9 therein normally closed by a closure plate 10. As can be seen in Figures 1 and 6, the closure plate 10 is held in closed position by a bar 11 which is hingedly secured in place as at 12', with one end terminating under a detent member 12. This detent member 12 is constructed as shown in Figure 10. In other words, a portion of the intermediate part of this element 12 is removed to leave a recess 13, to the end that when the member 12 is rotated by a handle 14, the member 12 is disposed over the corresponding end of the bar 11 and when the handle is rotated in the other direction, the recess 13 permits the bar 11 to be lifted and the closure plate 10 removed. The element 12 is journaled through a pair of bearings 15, 15.

An elongated spirally disposed fin 16 is provided inside of the drum 8 for directing material onto inwardly projecting blades 17, these blades serving to lift material and release the same at a certain inclination of the blades to the end that the material will be dumped into the tube 7 through a slot 18 in the top thereof, it being borne in mind that the tube 7 is stationary. A hub 19 is provided at each end of the drum 8 for embracing the corresponding end portions of the tube 7 and suitable lubricating fittings 20 are provided on these hubs. These hubs are secured in place by securing means which also secures in place suitable clamp means 21 at the inside of the end portions of the drum 8, these clamp means serving to clamp the ends of a cylindrical screen 22 in place in spacial disposition surrounding the tube 7.

A screw or spiral member 23 is longitudinally disposed in the tube 7 from an intermediate point past the opening 18 to terminate at one end of the tube 7 and from the innermost end of this feed spiral 23 extends a shaft 24 projecting beyond support 6 and the adjacent end of the tube 7 where it is provided with a multiple pulley 25.

Within the frame 5 and forwardly of the drum 8 is a blower unit including a blower fan housing 26 having a removable cover plate 27.

A bracket 28 is provided on this removable cover plate 27 and has a pair of bearings 29, 29 thereon through which a shaft 30 is journaled, this shaft 30 extending into the housing 26 and having a blower fan 31 suitably secured thereon.

An L-shaped spout 32 extends downwardly from the housing 26 as is clearly shown in Figures 1 and 4.

On the shaft 30 is a large pulley wheel 33 and a substantially smaller pulley wheel 34.

A rearwardly extending and tapered manifold box 36 is provided at the lower end of the spout 32.

From each vertical side portion of the manifold box 36 extends a plurality of flexible conduits 37 which are disposed rearwardly as is clearly shown in Figures 1 and 3. Each of these conduits 37 terminates in a fixed nozzle 38. Depending brackets 39 provided with clamps 40 support horizontally a pipe 41 which is flanged at its ends outwardly as at 42 (see Figure 8). The upper portions of these flanges 42 are rolled to provide barrels 43 through which the ends of link members 44 are disposed. These links support wing sections 45 also of pipe lengths and each of these wing sections at its inner end is provided with a flange 46, the upper portion of which is rolled to provide a barrel 47 for accommodating the remaining ends of the links 44. Thus the wing sections 45 are swingably connected to the sustaining section 41 and to the end that the wing sections 45 can be swung upwardly to the position shown in Figure 2, carrying with them the nozzle end portions of the conduits 37, as when the apparatus must pass through a restricted space (see Figure 2).

Arms 48 extend downwardly from the pipe 41 and the wing sections 45 and are secured to the nozzles 38 so that the nozzles are rigidly held in the desired spaced relation.

A shaft 50 extends longitudinally of the drum 8 and this shaft 50 at its ends is disposed through the upper portions of bearing blocks 51 which are equipped with suitable lubricating fittings 52'.

The lower portions of these blocks 51 have openings therethrough for receiving supporting pins 52, each of which has one end welded or otherwise secured as at 53 to the head 54 of a bolt 55 which passes downwardly through the corresponding side portion a of the frame 5. A cotter pin or the like 56 is provided at the remaining end of each of the pins 52. Thus the blocks 51 are swingably mounted, but are held in outwardly disposed position by compression springs 57. As can be seen in Figure 6, a bracket 58 is provided for each of the blocks 51 and a pin 59 projects from each bracket 58 and through an opening 60 in the corresponding block 51. The coiled compression spring 57 is disposed on the corresponding pin 59 between the bracket 58 and the block 51 for holding the belts associated with the shaft 50 in taut condition.

The rear end of the shaft 50 is provided with a multiple pulley 62 and a belt 63 is trained between this pulley 62 and the pulley 25 which drives the feed shaft 24.

The remaining end of the shaft 50 is provided with a pulley 64 and between this pulley and the pulley 34 on the shaft 30 (see Figure 4) is a belt 65.

Numeral 66 denotes a drive shaft (see Figure 1) having a pulley 67 between which and the pulley 33 on the blower fan shaft 30 is trained a belt 68.

On the shaft 50 is a pulley 75 which has trained thereover a belt 76, this belt being trained around the drum 8 for the purpose of driving the drum.

In the operation of the apparatus, chemicals are placed in the drum 8 through the door 10, in such quantities and proportions as desired. The unit is preferably mounted on a tractor by attaching the frame of the unit thereto. The mechanism is driven by a power driven shaft 50. The chemicals in the drum 8 are picked up by the blades 17 as they revolve with the drum and are dropped through the screen 22 into the opening 18 in the tube 7 where they are carried by the revolving feed screw 23 into the blower 6. The screen 22 obviously prevents any foreign matter from getting into the tube 7 and being carried into the blower. Pressure is developed by the revolving impeller 31 in the blower, which blows the chemicals from the blower housing, through its exhaust and to the manifold 36, from where the chemicals escape by way of the flexible conduits 37. The chemicals spread from the nozzles 38 of the conduits onto vegetation as desired. It is desired that the conduits 37 be flexible to facilitate use of different levels.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a distributing machine of the character described, a blower unit, an elongated tubular member having an opening in the side wall thereof, a drum rotatably mounted on the tubular member and over the opening therein, a shaft extending into the tubular member from one end thereof, the other end of the tubular member extending into the blower unit, a screen in the drum and carried thereby, said screen enveloping that portion of the tubular member within the drum, and a feed screw extending in the tubular member toward the blower unit from said shaft.

2. In a distributing machine of the character described, a blower unit, an elongated tubular member having an opening in the side wall thereof, a drum rotatably mounted on the tubular member and over the opening therein, a shaft extending into the tubular member from one end thereof, the other end of the tubular member extending into the blower unit, a screen in the drum and carried thereby, said screen enveloping that portion of the tubular member within the drum, a feed screw extending in the tubular member toward the blower unit from said shaft, a drive shaft laterally of said drum, and drive means between the drive shaft and the first-mentioned shaft and between the drive shaft and the blower unit.

3. In a distributing machine of the character described, a blower unit, an elongated tubular member having an opening in the side wall thereof, a drum rotatably mounted on the tubular member and over the opening therein, a shaft extending into the tubular member from one end thereof, the other end of the tubular member extending into the blower unit, a screen in the drum and carried thereby, said screen enveloping that portion of the tubular member within the drum, a feed screw extending in the tubular member toward the blower unit from said shaft, a drive shaft located laterally of the drum and blower unit, drive means between the drive shaft and the first-mentioned shaft, drive means between the drive shaft and the drum for rotating the drum on the tubular member, and drive means between the drive shaft and the blower unit.

AUGUST W. GUSTAFSON.